United States Patent [19]

Kiyota

[11] Patent Number: 5,424,505
[45] Date of Patent: Jun. 13, 1995

[54] SPOT WELDING MACHINE

[75] Inventor: Kazuhiro Kiyota, Hiroshima, Japan

[73] Assignee: Hirotec Corporation, Hiroshima, Japan

[21] Appl. No.: 188,800

[22] Filed: Jan. 31, 1994

[51] Int. Cl.⁶ .................. B23K 11/11; B23K 11/31
[52] U.S. Cl. ................................................ 219/86.25
[58] Field of Search ................. 219/86.25, 86.23, 89, 219/86.33, 79, 80, 117.1

[56] References Cited

U.S. PATENT DOCUMENTS

| | | | |
|---|---|---|---|
| 4,419,557 | 12/1983 | Gellatly | 219/86.25 |
| 4,593,850 | 6/1986 | Ariga et al. | 219/80 |
| 4,812,612 | 3/1989 | Perkins | 219/89 |
| 4,845,333 | 7/1989 | Hidata | 219/80 |

FOREIGN PATENT DOCUMENTS

| | | | |
|---|---|---|---|
| 52-22548 | 2/1977 | Japan | 219/86.25 |
| 61-245980 | 11/1986 | Japan | 219/117.1 |
| 63-215381 | 9/1988 | Japan | 219/86.25 |
| 1-224171 | 9/1989 | Japan | 219/86.25 |
| 2-89580 | 3/1990 | Japan | 219/117.1 |
| 3-99783 | 4/1991 | Japan | 219/86.25 |

*Primary Examiner*—Geoffrey S. Evans
*Attorney, Agent, or Firm*—Longacre & White

[57] ABSTRACT

An indirect system spot welding machine in which the jig grasps a work via the material handling robot, said jig being comprised of a work clamper portion to clamp and fix the work and an earth clamper portion to connect the work to the terminal of an earth cable at a welding transformer side, the spot welding machine being provided with a lifting mechanism for supporting an electrode and another lifting mechanism for supporting a back bar, independently, to shorten the length of the earth cable to be used and eliminate the necessity of the particular jigs for the work positioning and to prevent pressed trace by the spot electrode from the products.

4 Claims, 6 Drawing Sheets

SPOT WELDING MACHINE

FIELD OF THE INVENTION

The present invention relates to an indirect system spot welding machine.

BACKGROUND OF THE INVENTION PRIOR ARTS

There existed various kinds of indirect system spot welding machines for welding hemming portions of an automobile door or the like. However, such conventional indirect system spot welding machines have been said to have a drawback resulting from remaining some pressed traces caused by pressing the spot electrode to the work (pressed product). It has been requested to eliminate such a drawback of pressed traces. Also, there is a problem connecting the secondary earth cable of the welding transformer to the work side.

In conventional system, a particular jig was provided in the material handling side to fix the work at a predetermined position. While, an earth cable is always connected at jig side. Further a back bar is fixedly provided to outside surface of the work, and the back bar accepts the pressure of the spot electrode from the welding side.

Accordingly, workability of the particular jig is limited, thus construction cost is adversely increased. Further, the amount of the earth cable wired at secondary side is increased and freedom of space utility in the circumference of the spot welding machine is considerably restricted. The useful life of the earth cable is thus shortened.

SUMMARY OF THE INVENTION

The present invention is made to solve the aforementioned problem and is constructed as follows:

In the indirect system spot welding machine of the present invention, a material handling robot grasps the work by means of a jig arid the jig is comprised a work clamping portion to grasp and fix the work and an earth clamping portion to connect the work to earth cable terminal in the welding transformer side. Further, the spot electrode is provided with a self-lifting mechanism and the back bar is also provided with a self-lifting mechanism.

The indirect system spot welding machine of the present invention is constructed as aforementioned and it is characterized in that the back bar is of free working mechanism to follow along the contour of the work.

The indirect system spot welding machine of the present invention is provided with an independent actuation source for the lifting mechanism to support the spot electrode and another independent actuation source for the lifting mechanism to support the back bar. It is characterized that each lifting mechanism can control working speed and supporting pressure, respectively.

In the construction of the spot welding machine of the present invention, the jig to grasp the work in the material handling robot side is provided with the work clamping portion to clamp the work fixedly and the earth clamping portion to connect said clamped work to the earth cable terminal at secondary side of the welding transformer. Said jig is applicable to some different kinds of works to clamp them fixedly. The earth is detachable freely. The earth cable is connected via the earth clamping portion to the jig by approaching the work toward the spot welding machine side. Accordingly, the length of the earth cable up to a predetermined terminal retaining position in the spot welding machine side is sufficient. No longer length of the earth cable up to the material handling robot as seen in the conventional spot welding machine is required. Further, the spot electrode and the back bar in the spot welding machine side are independently supported by separate lifting mechanisms. is therefore materialized that the work is grasped desirably so as not to cause any pressed trace of the spot electrode.

The spot welding machine of the present invention is constructed as such that the back bar to contact to the outer surface of the work has a free mechanism to follow along the contour of the work. The back bar can support the work along the contour of the work with even pressure. Accordingly, it is more and more difficult to cause a pressure trace on the work.

Further, the lifting mechanism to support the electrode and another lifting mechanism to support the back bar are independently provided with actuation source, respectively. Working speed of the lifting mechanism to support the electrode and supporting pressure of lifting mechanism to support the back bar are controllable, respectively. It is possible to control the pressure by spot electrode and supporting pressure by back bar in optimum condition. It is thus possible to offer an improved spot welding machine which helps prevent any pressed trace in comparison with conventional machines.

DETAILED DESCRIPTION OF THE PREFERRED EMBODIMENTS

FIG. 1–6 indicate the construction of the spot welding machine of the present invention concerning the embodiments of the present invention.

Figure 1:
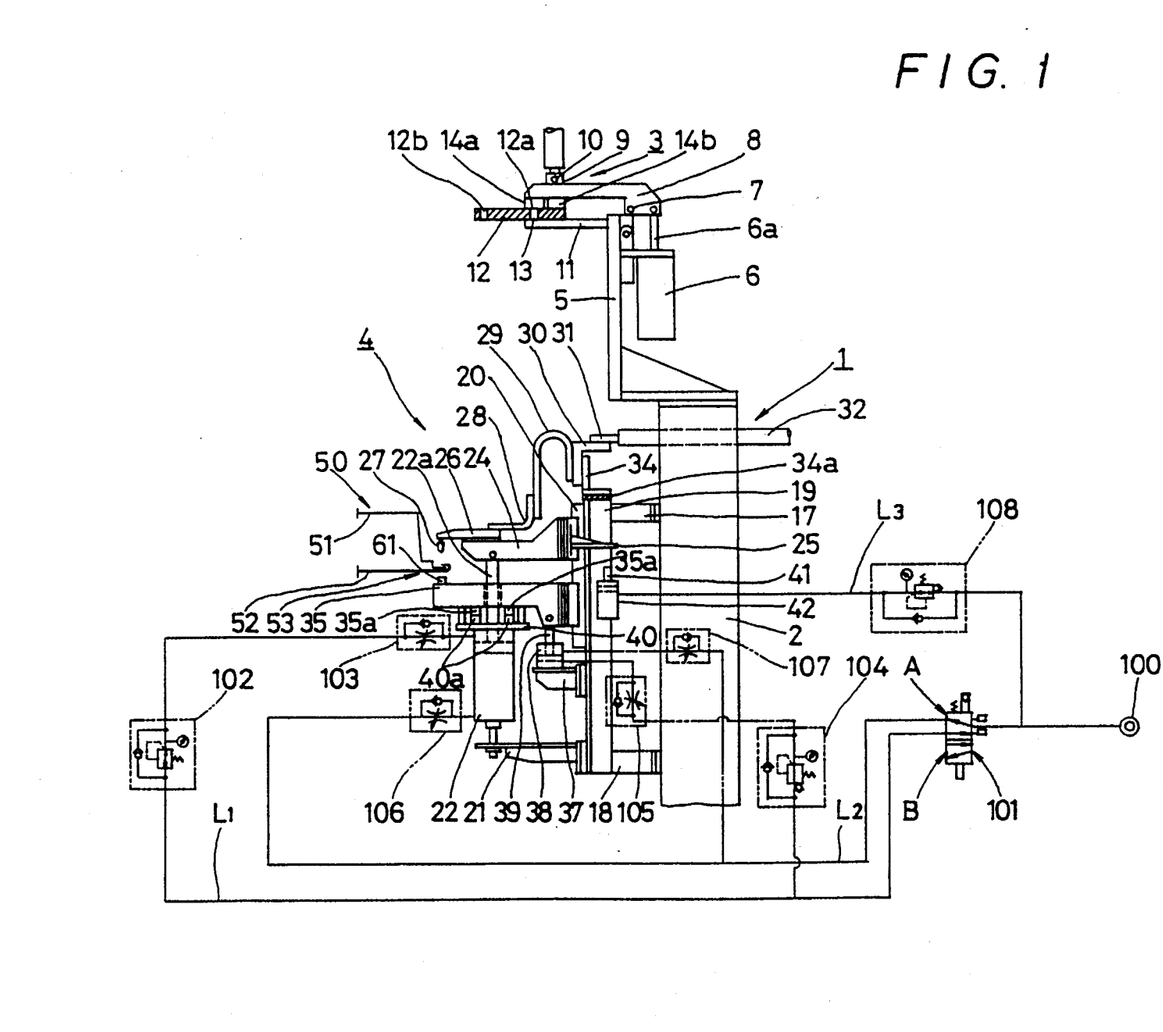
FIG. 1 shows general construction of the spot welding machine of the present invention and control system thereof.

FIG. 1, reference numeral 1 indicates a main body of the spot welding machine of the present invention. The main body of said spot welding machine 1 is comprised a welding stand 2, a holding portion 3 disposed above said welding stand 2 to hold an earth cable at the secondary side and a spot welding portion 4 disposed in the front side of said welding stand 2.

The earth cable holding portion 3 at said secondary side is constructed such that the holding portion of the angled form fixed above the welding stand 2, a cylinder 6 for holding earth cable supported vertically at the side surface of the wall above the cylinder supporting element 5, a lower arm (fixed arm) 11 for clamping an electric conductive detachable plate which is projected horizontaly from the upper end of the holding portion of the cylinder supporting element 5 (toward left side in FIG. 1), an upper arm (rotatable arm) 8 to clamp the electrode conductive detachable plate rotatably provided in the vertical direction by the cylinder rod 6a of the cylinder 6 for holding earth cable, said upper arm 8 being axially supported at the supporting member 5 by means of a hinge pin 7 at its middle portion of the back side and an earth cable terminal 9 at secondary side which is axially connected rotatably in left and right direction by means of a hinge portion 10 laterally from the upper arm 8. The terminal 9 of the secondary side earth cable is integrally united through the electric conductive detachable plate 12 and the connection member 14b at one end. At the lower side of the end portion of the upper arm 8, there is provided between a lower arm 11 and a pressing member 14a, the electric conductive detachable plate 12 (a connecting electric conductive plate to connect the automobile door as a work to the secondary earth cable terminal 9).

There is provided a first positioning pin 13 in the upper top portion of the lower arm 11 at the position while the electric conductive plate 12 faces to the pressure member 14a above the lower arm 11 to engage said first pin 13 with a first positioning hole 12a disposed in the electric conductive detachable plate 12.

As shown in FIG. 1, said electric conductive detachable plate 12 is held by the spot welding machine main body 1 by inserting the first positioning pin 13 into the first positioning hole 12a.

Figure 2:
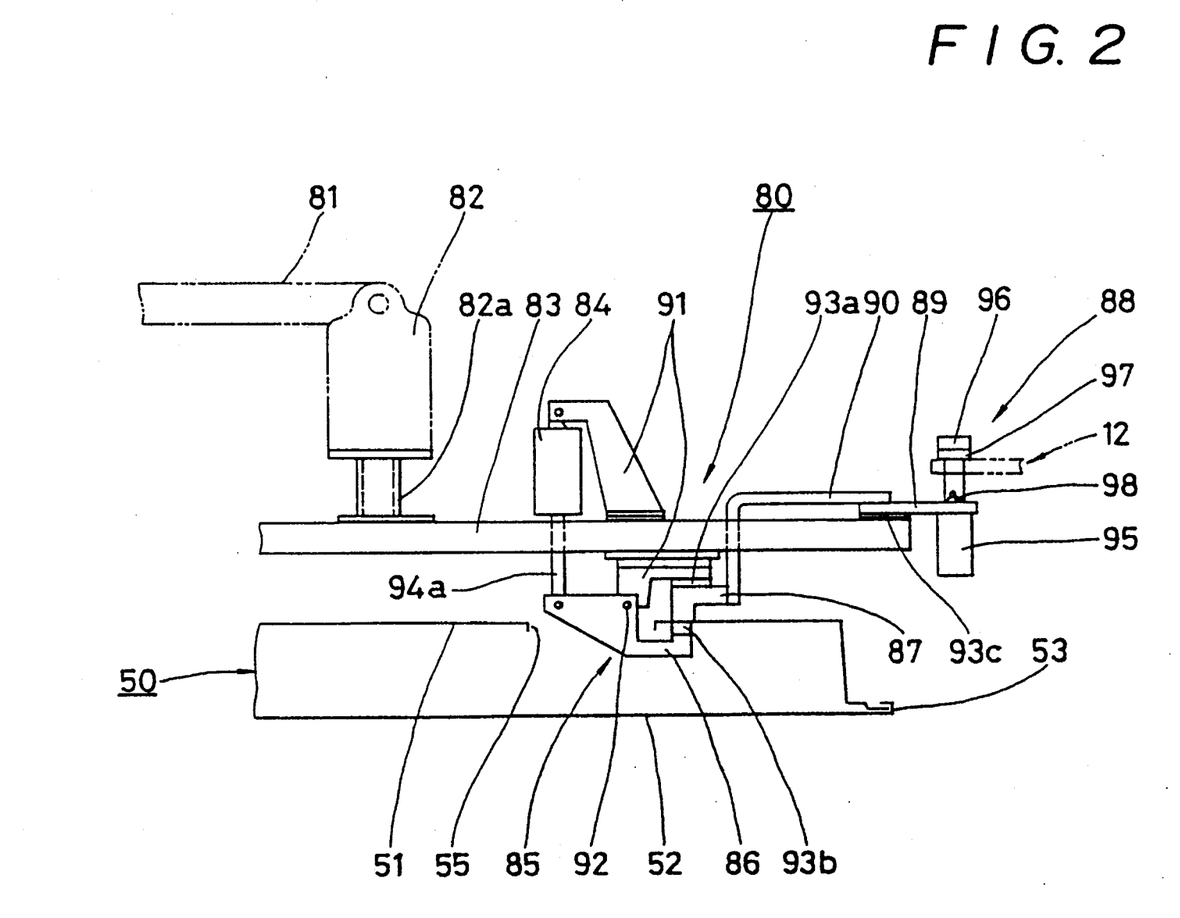
FIG. 2 is a side elevation of the principal part of the material hand ling portion of the spot welding machine of the present invention.

Holding of the electric conductive detachable plate 12 is continued by action of a robot arm 81 in the material handling robot side until a work clamper 85 of a material handling tool (jig) 80 shown in FIG. 2 clamps an automobile door 50 (pressed work) from the work conveying line and return to the upper portion of the spot welding machine main body 1 for welding operation and the work clamper 85 is clamped by an electric conductive detachable plate clamper 88 of a material handling tool side 80.

FIG. 2 shows a construction of the material handling tool 80 suspended from the robot arm 81 via a robot wrist 82 and an adapter 82a.

The material handling tool 80 is composed of a material handler 83 supported by the adapter 82a of the robot wrist 82, a work clamper 85 supported under the material handler 83 via a cylinder 84 for clamping the work, an electric conductive element 87 which functions as an earth electrode provided against a work clamp arm 86 under a supporting bracket 91, an electric conductive detachable plate clamper 88 provided on the tip end of said material handler 83, an electric conductive plate 89 underneath the electric conductive detachable plate clamper 88 and an electric conductive earth connection plate 90 to connect the electric conductive plate 89 to the electric conductive element 87.

The work clamper 85 is constructed to rotatably support the work clamp arm 86 in the vertical direction via a hinge pin 92 under the supporting bracket 91 fixed to the material handler 83. The tip end of the clamp arm 86 is inserted through a service hole 55 of a inner panel 51 of the automobile door 50. A cylinder rod 84a of the work clamping cylinder 84 extends and the inner panel 51 is set to clamp and fix said automobile door 50 as shown in the figure. The electric conductive plate 89 of the electric conductive detachable plate clamper 88 is electrically connected to the inner panel 51. In FIG. 2, reference numerals 93a–93c, and 97 indicate insulation members.

The electric conductive detachable plate clamp 88 of the material handling tool side 80 is provided with a clamp piece 96 confronting with the electric conductive plate 89 having a second positioning pin 98 like the first positioning pin 13 in the holding portion 3 of the spot welding machine main body 1. The clamp piece 96 is actuated downward by a clamp cylinder 95. As shown with an imaginary line at the back side of the electric conductive detachable plate 12 via the insulation member 97, the second positioning pin 98 is inserted through the second positioning hole 12b of said electric conductive detachable plate 12. At the same time, clamping at the holding portion 3 is released. In this process the earth cable terminal 9 of the welding transformer is connected to the, inner panel 51 of the automobile door 50.

Afterward, the material handling robot is actuated to take down the material handling tool 80 to the welding gun portion. A spot welding machine portion 4 disposed in front of the welding stand 2 is supported by a pole 19 supported in the vertical direction by upper and lower connecting members 17 and 18, a guide rail 20 of a predetermined length fixed in the vertical direction in front of the supporting pole 19, an electrode supporting arm 24 slidably supported in the vertical direction along the upper portion of the guide rail 20, a back bar supporting arm 35 slidably supported in the vertical direction along the guide rail 20 with its end under the electrode supporting arm 24 and a supporting member 21 horizontally projected from the supporting pole an electrode supporting arm lifting cylinder 22 (electrode lifting mechanism) of which a cylinder rod 22a going through the back bar supporting arm 35 and a supporting member 37 projected from the supporting arm 19. The spot welding machine portion 4 is further constructed by a back bar supporting arm lifting cylinder (back bar supporting arm lifting mechanism) 38 being connected to the back bar supporting arm 35 with a cylinder rod 39, an electrode adapter 26 fixed on the supporting arm 24 via insulation member, a spot electrode 27 provided under the electrode adapter 26, a first and a second flexible electric conductive plates 28, 29 connected to the back of the electrode adapter 26, an electric conductive connection plate 30 of an angle form connecting the second electric conductive plate 29 to a connection terminal 31 of a power cable 32 of the welding transformer, and a connection plate supporting member 34 to connect the connection plate 30 to the upper end of the supporting pole 19 via an insulation members 34a.

Figure 3:
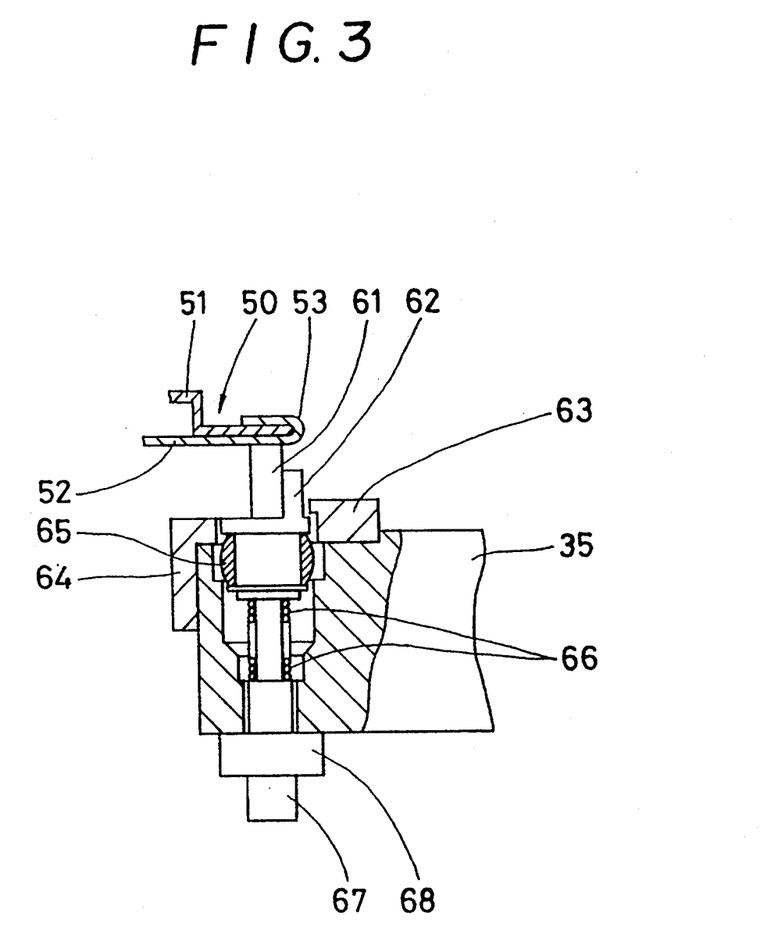
FIG. 3 is a cross-section of the principal part of the back bar portion of the present invention.

In the meantime, as shown in FIG. 3, at the portion confronting the spot electrode 27 of the back bar supporting arm, there is provided a back bar 61 freely follows along the contour of an outer panel 52 of the automobile door 50. The back bar 61 is elastically supported on the back bar supporting arm 35 via the free mechanism of a spherical joint 65 and a compression spring 66.

In FIG. 3, reference numeral 62 indicates a back bar mounting adapter, reference numeral 63, 64 indicate a first and a second antirotation members, reference numeral 67 indicates an adjusting bolt and reference numeral 68 indicates an adjusting nut. Degree of compression pressure of the compression spring 66 to the spherical joint 65 is changed by releasing the adjusting nut 68 to rotate the adjusting bolt 67 and a following pressure of the back bar 61 to the door outer panel 52 is freely adjusted. There is provided an engagement piece 25 at the back end of the electrode supporting arm 24.

Figure 4:
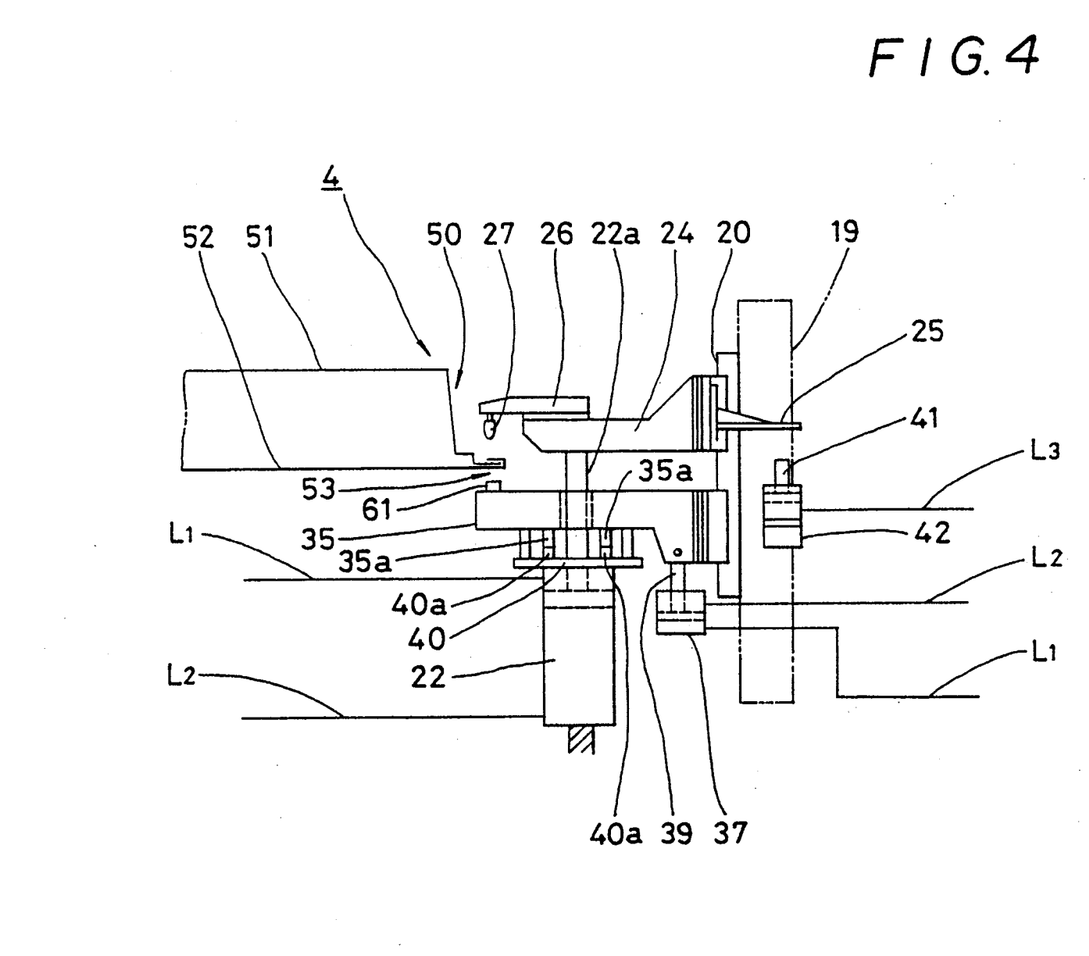
FIG. 4 is a side elevation showing construction of the spot electrode of the spot welding machine of the present invention.
Figure 5:
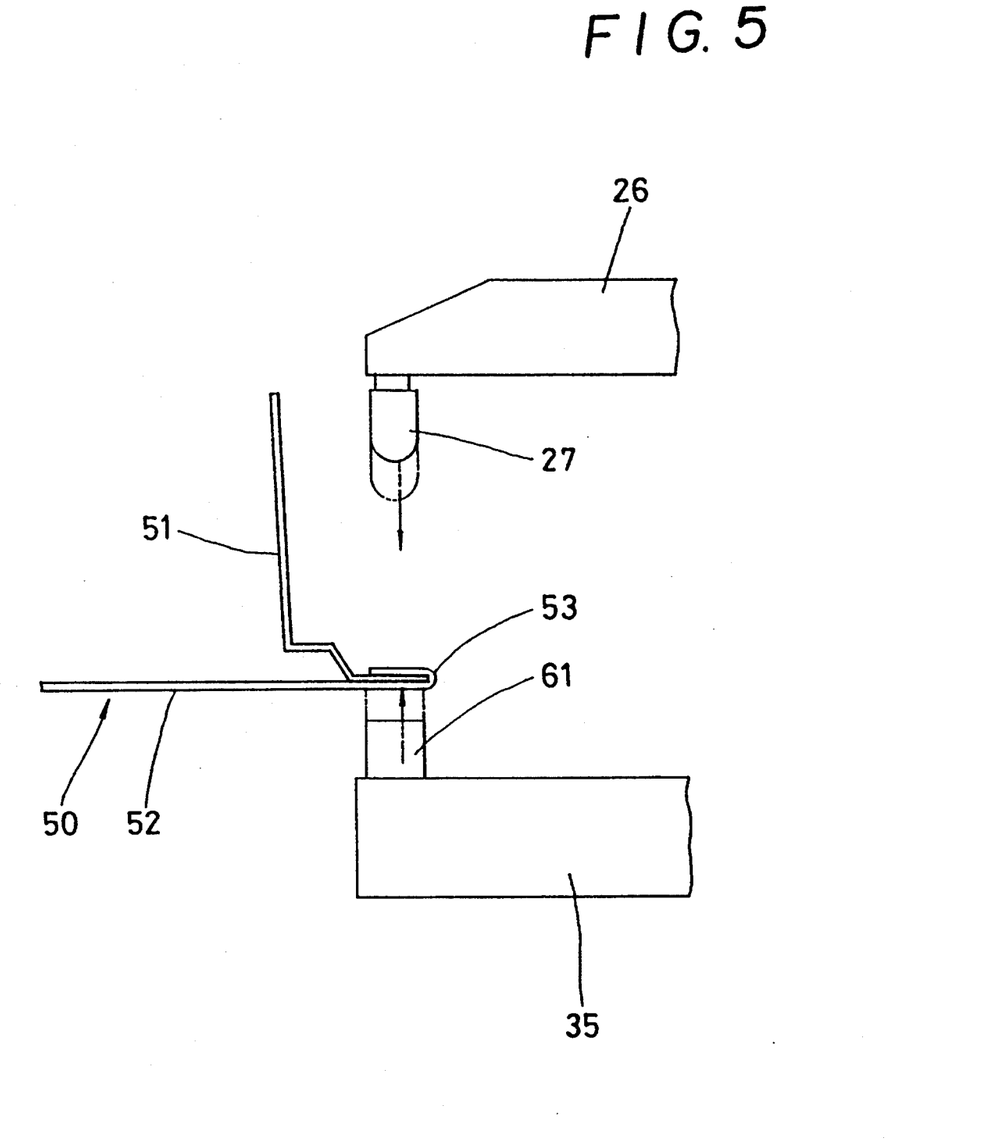
FIG. 5 is an enlarged side elevation explaining the work of the spot electrode portion of the spot welding machine of the present invention.

In FIG. 4, when weight of the electrode supporting arm 24 is loaded to the hemming portion 53 of the automobile door 50, there is provided a balance cylinder 42 to eliminate the weight load to the hemming portion 53 by supporting the engagement piece 25 by actuation of the cylinder rod 41.

Further reverting to FIG. 1, reference numeral 100 indicates an air source which supplies free air pressure and free air flow to the electrode supporting arm lifting cylinder 22 and the back bar supporting arm lifting cylinder 38, respectively. Said air source 100 is connected to the electrode supporting arm lifting cylinder 22 via a solenoid valve 101 providing with A port and B port, a first air pressure adjusting valve 102 and a first air flow adjusting valve 103. The air source 100 is also connected to the electrode supporting arm lifting cylinder 22 via the magnetic electrode valve 101 and a second air flow adjusting valve 106.

Further, said air source 100 is connected to the back bar supporting arm lifting mechanism 38 via the magnetic electrode valve 101, the second pressure adjusting valve 104 and the third air flow adjusting valve 105. It is also connected to the back bar supporting arm lifting cylinder 38 via the magnetic electrode valve 101 and a fourth air flow adjusting valve 107. On the other hand, The air source 100 is connected to the balance cylinder 42 via a third air pressure adjusting valve 108.

Now, as shown in FIG. 1, the hemming portion 53 of the automobile door 50 is set at the welding position when the material handling tool 80 comes down to the spot electrode portion. In this position the magnetic electrode valve 101 is located in the A port side. One side of the electrode supporting arm lifting cylinder 22 is in exhausting condition and the other side is in pressing condition. The back bar supporting arm lifting cylinder 38 is in adverse condition. Accordingly, said supporting arms 24, 35 are in opened condition.

On the other hand, when connection of air source 100 of the electromagnetic control valve 101 is changed from A port to B port, line $L_1$ is converted to pressing condition and line $L_2$ is converted to exhausting condition.

Afterward, air pressure in line $L_1$ is adjusted to a predetermined pressure at the first air pressure control valve 102 and then it is fed to the electrode supporting arm lifting cylinder 22. On the other hand, air in the other side is exhausted, being controlled by the second air flow control valve 106. The back bar supporting arm lifting cylinder 38 is actuated in adverse condition. Accordingly, the electrode supporting arm 24 comes downward and the back bar supporting arm 35 synchronously goes upward.

The back bar 61 contacts to the back side of the hemming portion 53 of the automobile door 50. Air pressure and air flow are precisely controlled by means of the second air pressure valve 104, the third air flow control valve 105 at pressure side and the fourth air flow control valve 107 at exhausting side, so as to keep contacting pressure of the back bar 61 in optimum soft condition.

As shown in FIG. 4, the electrode supporting arm 24 comes down and the spot electrode 27 contacts the upper surface of the hemming portion 53 and then a predetermined clearance S is formed between the stopper 35a, 35a of the lower portion of the back bar supporting arm 35 and the stopper 40a, 40a of the upper portion of the supporting plate 40 of the electrode supporting arm lifting cylinder 22. If such clearance S is not formed, the weight of the electrode supporting arm 24 is not loaded to the hemming portion 53. On the other hand, if such clearance S is enlarged beyond the predetermined value, the weight of the electrode supporting arm 24 is loaded to said hemming portion 53.

When the above weight is loaded, the balance cylinder 42 is actuated to receive that lead. Accordingly, the hemming portion 53 at work side is not loaded with the weight and is spot welded.

A constant air pressure which is possible to keep balance against the electrode weight is supplied at anytime by means of the third air pressure control valve 108 providing with a relief function of the pressure line $L_2$. The electrode supporting arm lifting cylinder 22 actuates slightly to generate an optimum spot welding pressure. Then the spot electrode 27 proceeds spot welding. The optimum spot welding pressure is adjusted by means of the third air pressure control valve 102.

In the embodiment shown in

Figure 6:
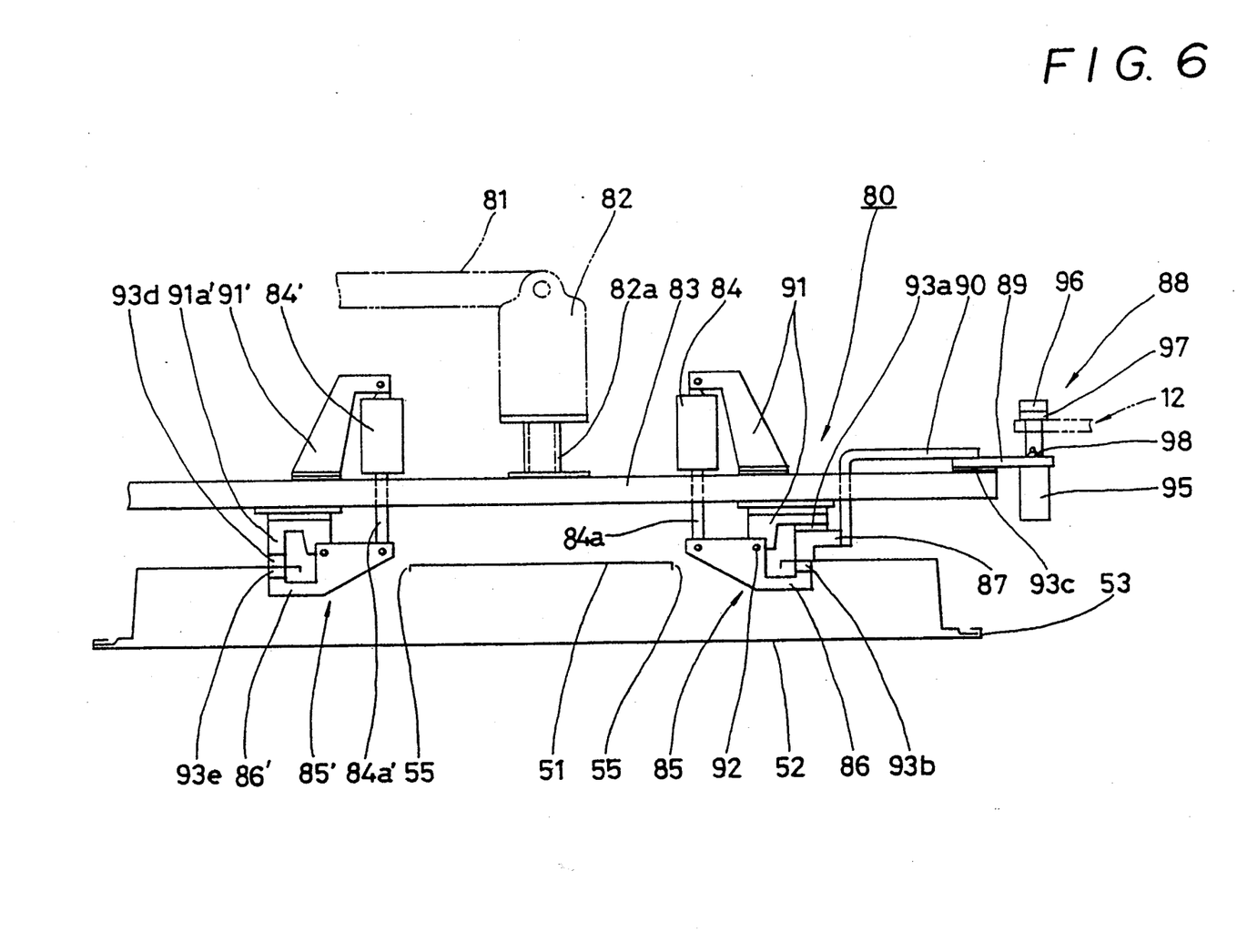
FIG. 6 is a cross sectional view showing one of variation of the spot welding machine of the present invention.

FIG. 2, it is further preferable to combine the work clamper 85 which has earthing function and the work clamper 85' which has no function of earthing as sown in FIG. 6. In FIG. 6, reference numerals 93d, 93e indicate insulation members. Reference numeral 91' a indicates a clamp piece at the supporting bracket 91' side.

EFFECT OF THE INVENTION

As aformentioned, the spot welding machine of the present invention can expand versatility of the jig at robot side and shorten the necessary length of the earth cable as well as decreasing construction cost. The working space factor at the circumference of the spot welding machine is improved as well as decreasing total cost. It is also possible to offer high quality products while leaving no pressed spot welding trace.

What is claimed is:

1. An indirect system spot welding machine for welding a workpiece comprising:
    a material handling robot adapted to grasp said workpiece with a jig, said jig comprising a workpiece clamping portion to grasp said workpiece;
    a first lifting mechanism to support and reciprocate a spot electrode in a linear direction;
    a back bar member adjacent said spot electrode, said bar member being adapted to abut said workpiece;
    a second lifting mechanism to support and reciprocate said back bar member in said linear direction independently of said first lifting mechanism.

2. The indirect system spot welding machine of claim 1, wherein said back bar member comprises a free mechanism adapted to engage said workpiece and move relative to said back bar member along a contour of said workpiece.

3. The indirect system spot welding machine of claim 1, wherein said first and second lifting mechanisms are respectively provided with actuation sources, and wherein said first lifting mechanisms independently controls an actuation speed of said spot electrode, and said second lifting mechanism independently controls a supporting pressure.

4. An indirect system spot welding machine for welding a workpiece having a material handling robot adapted to grasp said workpiece with a jig, said jig comprising:

a workpiece clamping portion to grasp said workpiece;

an earth clamping portion to connect said workpiece to an earth cable terminal;

wherein said earth cable terminal for grounding said workpiece is connected via said earth clamping portion to said jig.

* * * * *